(12) United States Patent
Sørensen (10) Patent No.: US 11,512,765 B2
(45) Date of Patent: Nov. 29, 2022

(54) LINEAR ACTUATOR

(71) Applicant: LINAK A/S, Nordborg (DK)

(72) Inventor: Claus Hegelund Sørensen, Nordborg (DK)

(73) Assignee: Linak A/S, Nordborg (DK)

(*) Notice: Subject to any disclaimer, the term of this patent is extended or adjusted under 35 U.S.C. 154(b) by 560 days.

(21) Appl. No.: 16/484,239

(22) PCT Filed: Feb. 13, 2018

(86) PCT No.: PCT/DK2018/000003
§ 371 (c)(1),
(2) Date: Aug. 7, 2019

(87) PCT Pub. No.: WO2018/145707
PCT Pub. Date: Aug. 16, 2018

(65) Prior Publication Data
US 2019/0390751 A1 Dec. 26, 2019

(30) Foreign Application Priority Data
Feb. 13, 2017 (DK) .......................... PA 2017 00105

(51) Int. Cl.
*F16H 25/20* (2006.01)
*G01B 7/00* (2006.01)

(52) U.S. Cl.
CPC .......... *F16H 25/2015* (2013.01); *G01B 7/003* (2013.01); *F16H 2025/2081* (2013.01)

(58) Field of Classification Search
CPC .......... F16H 25/2015; F16H 2025/2081; G01B 7/003
See application file for complete search history.

(56) References Cited

U.S. PATENT DOCUMENTS

| | | | |
|---|---|---|---|
| 6,497,035 B1 * | 12/2002 | Ratliff | G01B 7/003 174/117 F |
| 6,513,398 B1 | 2/2003 | Finkemeyer | |
| 2004/0254040 A1 | 12/2004 | SomSchor et al. | |
| 2007/0216402 A1 * | 9/2007 | Blessing | G01D 5/145 324/207.24 |

(Continued)

FOREIGN PATENT DOCUMENTS

| | | |
|---|---|---|
| DE | 101 43 325 A1 | 3/2003 |
| DE | 10 2005 035 104 B4 | 3/2007 |

(Continued)

*Primary Examiner* — Noam Reisner
(74) *Attorney, Agent, or Firm* — Dykema Gossett PLLC (57) ABSTRACT

Linear electric actuator (1) comprising a housing (10) with a reversible DC-motor (2), which through a transmission (3) can move an activation element (6) between two end positions, where an incremental position detection system is adapted to indicate the position of the spindle nut (5) during its travel on the spindle (4) and where the accuracy of the position detection system continuously is calibrated in that a magnet (15) is arranged in connection with the spindle nut (5), and at least one magnetic sensor (13,14) is arranged within the housing (10) of the actuator in a position where a proximity with the magnet (15) arranged in connection with the spindle nut (5) on its travel on the spindle (4) is achieved to establish a reference point for the position detection system.

22 Claims, 4 Drawing Sheets

(56) References Cited

U.S. PATENT DOCUMENTS

| | | | |
|---|---|---|---|
| 2010/0315031 A1* | 12/2010 | Jensen | F16H 25/2015 318/627 |
| 2011/0068725 A1* | 3/2011 | Bastholm | F16H 25/2015 318/468 |
| 2012/0227524 A1 | 9/2012 | Takahashi et al. | |
| 2013/0141030 A1 | 6/2013 | Duits et al. | |

FOREIGN PATENT DOCUMENTS

| | | |
|---|---|---|
| EP | 0 831 250 A2 | 3/1998 |
| WO | 2007006313 A1 | 1/2007 |

* cited by examiner

LINEAR ACTUATOR

CROSS-REFERENCE TO RELATED APPLICATIONS

This application is a national stage filing based upon international application no. PCT/DK2018/000003, filed 13 Feb. 2018 (the '003 application), and published in English on 16 Aug. 2018 under international publication no. WO 2018/145707 A1, which claims priority to Denmark (DK) patent application no. PA 2017 00105, filed 13 Feb. 2017 (the '105 application). The '003 application and the '105 application are both hereby incorporated by reference as though fully set forth herein.

The invention relates to a linear actuator comprising a reversible DC motor, which through a transmission drives a spindle, and thus can apply a linear movement to a spindle nut retained against rotation, where the spindle nut is connected to an activation element, which can be displaced between two end positions on the spindle, a power supply for the DC motor, an electric control, and a position detection system for determining the position of the spindle nut on the spindle.

The explanation of the invention takes its point of departure in a linear actuator of the type comprising an activation element, which is axially displaceable in the longitudinal direction of the actuator. A linear actuator comprises an electric motor, which through a transmission drives a spindle. On the spindle, there is a spindle nut, to which a tubular activation element is secured with its one end. The other end of the activation element is by means of a front mounting secured to the movable element in the construction in which the actuator should be incorporated, while the actuator with a rear mounting is secured to the stationary part of the construction or vice versa.

An absolute determination of the position of the activation element can be achieved with a potentiometer, e.g. a rotary potentiometer, which through a gearing is driven by a motor. The position of the sliding block of the rotary potentiometer will move proportionally to the position of the activation element and can thus, when the potentiometer is connected to an electric control, indicate the position of the activation element (EP 0 831 250 A2 Dana Corp.). A potentiometer in the form of a sliding potentiometer located parallel to the spindle is also known. Here, the spindle nut is typically connected to the sliding block of the potentiometer (DE 10 2005 035 104 B4 Dewert Antriebs- and Systemtechnik).

Another and more common method for determining the position of the activation element, which for financial and reliability reasons is preferred in actuators, is by counting the number of rotations performed by the spindle. The number of rotations multiplied by the thread pitch of the spindle determines the position of the activation element. When the gear ratio is known, it is possible to calculate how many rotations the spindle has performed. A way of determining the position of the activation element by counting rotations is by using incremental sensors such as e.g. a magnetic encoder. A magnetic encoder comprises a magnetic ring with a number of poles, which activates a Reed-switch of a Hall-sensor each time one of the poles passes by the switch, alternatively the Hall-sensor, by which an electric signal is sent out (WO 2007/006313 A1 Linak A/S).

As an alternative to a magnetic encoder an optical encoder can be used, which functions in the same way namely with a rotating disc with perforations and a light source. When a perforation passes by the light source a light beam is temporarily let through to a photo cell, which thus sends out a signal. Based on the signals the position is calculated by a microprocessor in the control.

In connection with the initiation of an incremental position detection system, the starting point must be a known position of the spindle nut on the spindle, which could be one of the two end positions of the travel of the spindle nut on the spindle.

The mentioned systems provide a good determination of the position of the spindle nut but still have their limitations and are associated with disadvantages.

Using a potentiometer is generally approved as a potentiometer is a variable voltage divider, where a voltage measured on the outlet of the potentiometer gives a directly proportional indication of the position of the spindle nut on the spindle. This indication is correct regardless of whether the position is reached in a state where the voltage supply has been interrupted, e.g. by a purely mechanical impact on the actuator for instance by means of a quick release (WO 2007/006313 Linak A/S.) However, potentiometers are expensive and have the disadvantage that they are worn and over time become unreliable or risk failing.

A cheaper and more reliable solution is achieved with an incremental position detection system, e.g. of the magnetic type. In order to be able to provide an accurate position determination such a system requires that the counter arrangement is calibrated to the distance both with regard to the travel compared to rotations, but also is initiated with known positions of the spindle nut on the spindle. If the supply for such a system is interrupted, a new initiation must be performed in order to be able to completely rely on the position indication, as one cannot for certain know if a manual adjustment of the actuator has been performed in the meantime e.g. by release of a quick-release (WO 2007/006313 Linak A/S). Experience further shows that incremental systems from time to time will lose a few pulses, for which reason the position determination over time will become incorrect. This is particularly common in systems which never or rarely are moved against an end stop as a certain position for initiation of the counter arrangement.

A solution, which seek to overcome this problem, has been to insert mechanical switches arranged at select positions on the length of the spindle, which are activated mechanically when the spindle nut moves past. The signal from the mechanical switches can thus be used for a synchronization of the counter arrangement when the mechanical switches are activated. The challenge here is however that the mechanical switch due to the physical extent of the mechanical activation key is activated in different positions depending on in which direction the spindle nut moves on the spindle, for which reason this should also be taken into account when synchronizing the counter arrangement. Unfortunately, the solution has further proven not to be completely precise in terms of reproducibility of position/synchronization numbers, for which reason the number of pulses, which in reality is lost, at worst can be higher than the number of pulses lost during normal operation. Further, the mechanical switches are unstable over time, for which reason a different solution is desired, which is not mechanically worn.

The purpose of the invention is to provide a solution to the outlined problem, where a more accurate and precise synchronization of the counter is desired for an incremental position detection system, when the spindle nut reaches predetermined positions during its travel on the spindle. Here, is especially thought of a construction, which avoids mechanical tolerances, a solution which does not contain expensive components, a solution which is not mechanically worn and thus is more reliable over time.

According to the invention this is achieved by designing the actuator as stated in claim 1, where the position detection system is encased in the housing surrounding the components (mechanical and electric) of the actuator, and comprises at least one magnetic sensor arranged in a position on a length parallel to the axial direction of extent of the spindle, and further comprises a magnet arranged in connection with the spindle nut or the activation element.

Thus, the outlined problem is solved as the technical features are not limited by mechanical components but constitute electronic sensor components based on magnetism.

More elaborate, the arrangement of a magnet arranged in connection with the spindle nut or the activation element is elegant as a magnet can be given a random shape and size, and in a simple manner be mounted in a desired position. Thus, the spindle nut, which is often made from a plastic material, can be equipped with a recess in which a magnet can be inserted depending on whether the function in question is desired. The placement of the recess can expediently be constructed such that it is possible to insert the magnet in a desired position in connection with the scanning of the magnet with the at least one magnetic sensor Furthermore, the arrangement with at least one magnetic sensor arranged in a position on a length parallel to the axial direction of extent of the spindle is expedient as a sensor can be arranged in a desired position and due to the physical construction as a magnetic sensor detect the proximity of the magnet arranged in connection with the spindle nut or the activation element and give a signal, which corresponds to if the magnet is in immediate proximity. Thus, there are no mechanical parts, which due to movement can be affected by wear or contamination of the lubricants etc., which overall can affect the reliability of the position detection system.

In an embodiment, the position detection system is configured to receive and process a signal from the at least one magnetic sensor, where the signal indicates a known position of the spindle nut during its travel on the spindle, and is adapted subsequently to calibrate the counter value of the position detection system such that the counter value corresponds to a predetermined counter value of the position in question of the spindle nut during its travel on the spindle.

As explained in the preamble, a calibration of the position detection system is desired when the system is first put into use after a dead state of the position detection system, or a calibration of the position detection system when its counter value for one reason or the other gets out of sync with the counter value, which represents the actual position. It is understood that the position detection system in a state where it is supplied with voltage is able to monitor the position regardless of whether the change in position has been done by activation of the actuator system or caused by mechanical vibrations in the application or a different type of strain which can overcome the self-locking or braking ability of the actuator, or whether the change in position is caused by a manual adjustment e.g. by means of a hand crank.

In an embodiment, the at least one sensor is a digital magnetic sensor, which in the same manner as a switch is activated when the applied magnetic field exceeds a first threshold value, and is deactivated when the applied magnetic field falls below a second threshold value. It is given that a digital magnetic sensor gives off a value, which corresponds to the activation of a switch, which could be the either the state on or off, which can be achieved with the proximity of a magnetic field for instance by means of a permanent magnet. It is given that electrical filters should be implemented to prevent noise from mistakenly being perceived as an indication for that a calibration point has been reached. It should e.g. be ensured that the signal has a duration which corresponds to the time it takes to move the magnet over the magnetic sensor when the actuator is in operation.

In another embodiment, the at least one magnetic sensor is an analogue magnetic sensor, which gives a signal, which is proportional to the applied magnetic field. The position detection system is thus able to register when the magnetic field in the proximity of the sensor changes, and recognize a pattern where the strength of the magnetic field increases to a maximum and subsequently falls again. This is the pattern which indicates that the spindle nut equipped with a magnet moves past the area in which the magnetic sensor is arranged.

The position detection system is expediently equipped with a microcontroller and portions of instructions for conducting the counter process, which underlies the position detection system. Sample rate for the reading can in its normal state be with one frequency, which, when the amplitude of the read signal changes or increases, can change to a different frequency, expediently a higher frequency, which ensures that a maximum value of the reading can be identified with a higher accuracy. More specifically, the position detection system has a sample rate for the reading of the magnetic field near the sensor, which in its normal state has a first frequency which when the amplitude of the measured signal changes or increases, changes to a different frequency. The position detection system has means for comparing the change in the magnetic field to the change in counter value and validating that the reading of the change of strength of the magnetic field corresponds to the speed of the linear movement of the spindle nut on the spindle, for which reason the signal from the magnetic sensor can be regarded as valid. The position detection system has means for determining the maximum point of the strength of the magnetic field. When the maximum point of the strength of the magnetic field is reached, the counter value of the position detection system can be read off and the deviation from the calibration point calculated. The counter value can subsequently be changed in accordance with predetermined criteria in the control, where specific criteria will be described more fully later.

In another embodiment, the position detection system comprises at least two magnetic sensors arranged in a position on the length parallel to the axial direction of extent of the spindle. When the two magnetic sensors are digital magnet sensors and are located immediately after one another on the length, which is described by the travel of the spindle nut, a pattern is ensured, when the sensors are activated, where one sensor is activated before the other and deactivated before the other, when the spindle nut with the magnet moves past. The speed of the movement, which previously is described as being proportional to the counter change of the position detection system and the direction of which, can determine whether the signals of the sensors can be deemed reliable and whether an indication for a calibration point can be considered reached. Further, the system can determine that an incorrect sequence (order) of activation of the sensors or a simultaneous activation is an erroneous signal, which must be disregarded in order to perform a calibration of the counter of the position detection system.

In a particularly appreciated embodiment, the at least two magnetic sensors are of the analogue type and are positioned with such a distance between them that they both due to the width of the magnet give a signal, when the magnet is led past the sensors where the signal from one sensor is increasing while the signal from the other sensor is decreasing. By using two digital sensors, they are expediently arranged such that their signals either overlap when the magnet is led past the sensors, i.e. both are activated before they are deactivated regardless of the direction of movement, or that the first is activated and deactivated immediately before the second is activated and deactivated, where the order of whether the first or the second sensor is activated first or last depends on the direction of movement. Thus, the position can be calculated since the overlap or space between the signals can be mapped to specific positions calibrated to the position detection system. By using two analogue sensors a particular accuracy is achieved by measuring the amplitude of the signals from both sensors and determine when the signals have the same or approximately the same value. As thus described, the position detection system is adapted to compare the signals from the at least two magnetic sensors, and when the amplitude of the signals from both sensors is within a predetermined window, which describes values for signal amplitude, is adapted to indicate that a calibration point for the position detection system has been reached.

With a suitable configuration of the counter resolution relative to the mutual location of the two analogue magnetic sensors, it is possible to achieve a precision in terms of repeatable indication of the calibration point, which is on exactly the same counter stage each time.

Using analogue magnetic sensors in the construction moreover has the advantage that in case the magnet arranged in connection with the spindle nut loses some of its strength, alternatively is displaced, it does not influence the detection of the calibration point as the amplitude of the signals from both sensors will be equally affected by the weakened magnetic field. The crossing point between the decreasing signal and the increasing signal will therefore be unchanged regardless of whether the strength of the affected magnetic field is stronger or weaker, as long as it is detectable by the sensors. An obvious advantage can be seen by using two analogue magnetic sensors as the crossing point between the increasing and decreasing signal gives a more precise and clearly defined calibration point for the counter of the position detection system.

The position detection system according to the invention also allows for different features in connection with assessing when a calibration of the counter of the position detection system, which indicates the position of the spindle nut during its travel on the spindle, is required. When an actuator is used in a machine, it is often a requirement that the entire construction including the actuator system and its control is interrupted from the control and operating voltage when an emergency stop is activated. This means that the counter of the position detection system cannot be expected to be reliable, as an adjustment of the actuator system can be performed without this being registered by the position detection system.

In another embodiment, the position detection system is adapted to indicate the reliability of the current value for the position determination by placing a flag when the current value for position determination is calibrated with the value of a calibration point, and remove the flag, when the supply voltage for the position detection system is interrupted. By testing the status of the flag, it is thus possible to determine whether the position detection system is calibrated relative to the calibration point. Until a calibration has been performed it is not possible to provide a precise and reliable indication of the position of the spindle nut relative to the spindle.

In another embodiment, the position detection system is adapted, when a calibration point is reached, to compare a current value for the position determination to the value of the position determination for the calibration point and respond by performing one of the following actions:
1) overwrite the current value for position determination with the value of the position determination for the calibration point,
2) Change the current value for the position determination by a number, which causes the current value to come closer to the value of the position determination for the calibration point,
3) Check the status of flags for reliability and, if the status of flags indicates that the position detection system is not calibrated, overwrite the current value for position determination with the value of the position determination for the calibration point,
4) Determine the difference between the current value for position determination and the calibration value and, in case of a difference in counter value which is larger than a predetermined value, keep the current value and wait until the next meeting with a calibration point before the current value for position determination is overwritten with the value of position determination for the calibration point,
5) Determine the direction of the movement of the activation element by assessing whether the current value of the position detection system changes positively or negatively, and depending on the direction overwrite the current value of the position detection system with the value of the position determination for the calibration system adjusted by a value in the form of a number, which can vary depending on the direction of the movement of the activation element.

Here, it is understood that the term "value", which is used in the terms position detection value and calibration value can be values of a counter regardless of whether the counter expresses counter stages or is a value, which in a different manner indicates the current position of the spindle nut during its travel on the spindle or a position for a calibration point.

More expediently, the magnetic sensors are in an embodiment arranged on or in connection with the printed circuit board for the control, where the control and the magnetic sensors are arranged separated from the spindle and the spindle nut by means of a non-magnetic shielding wall. In a linear electric actuator, the spindle and the spindle nut as well as the gear mechanism are often arranged together in a housing for the mechanical parts. The control and partly the electric motor are often separated therefrom in a separate partial housing. The purpose is to avoid soiling by lubricants, which can damage the electronics in the control. Further, it is also a wish that the lubricants do not disappear from the areas, in which their effect is intended. Here, mechanical switches are a challenge as they must be placed in the area in which the mechanical parts are placed, for which reason they are exposed to lubricants. If the housing is made from a non-magnetic material, e.g. plastic or aluminium, it is however possible, as described in the invention, to signal magnetic signals between a magnet arranged in connection with the spindle in the separate mechanical part of the housing and a magnetic sensor arranged in the separated electronic part of the housing. Thus, a reliable detection of when the spindle nut meets a calibration point for the position detection system is achieved while simultaneously avoiding that the lubricant gets into contact with the electronics. In an embodiment where the printed circuit board of the control is arranged in the housing, such that this runs parallel to the spindle, the magnetic sensors are arranged in such a manner that they are positioned in the direction of extend of the spindle and are separated by a wall in the housing. In an embodiment where the housing is made from a magnetic non-permeable material, such as e.g. iron or steel, the housing is equipped with a window in the form of an opening opposite the position, where a calibration point between the magnet arranged in connection with the spindle nut and the magnetic sensors is arranged in the control. The opening is in an embodiment equipped with a cover, which is made from or which includes a magnetic permeable material such as e.g. plastics or aluminium. The construction, where the magnetic sensors are arranged in connection with the control either on or in connection with the printed circuit board therefor, is expedient, as the magnetic sensors due to the protected location in the housing are not only protected mechanically, but are also shielded from magnetic radiation by use of appropriate materials for the housing such that practical only the magnetic source, which is intended for the function, a magnet arranged in connection with the spindle nut or the displaceable element is in a proximity of the magnetic sensors, where these can be affected. This is obviously an advantage when placing the magnet and the magnetic sensors outside the housing or the casing of the actuator.

It is given that more calibration points of the described type can be implemented on the length on which the spindle nut travels. Thus, more calibration points with digital and/or analogue magnetic sensors can be placed freely in combination, and each serve either for giving an approximate or an accurate position determination depending on which of the described embodiments are implemented.

That the invention is described as at least one magnet arranged in connection with the spindle nut or the activation element makes it possible to use more magnets arranged in differing positions. It is possible to differentiate between the different magnets in that these all have different strength and thus individually can be unambiguously indicated by measuring using the analogue magnetic sensors. Another much appreciated embodiment where two or more magnets are arranged in connection with the spindle nut or the activation element is where the magnets are arranged differently with regard to their field direction. An analogue magnetic sensor will indicate this in that the signal is of opposite amplitude, for which reason a sensor can clearly distinguish two magnets from each other and identify these and their position, when these arranged in connection with the spindle or the activation element pass by during their travel on the spindle. This feature can in another embodiment be combined with the analogue sensors being arranged rotated about their axis 180 degrees (corresponding to mounting either on the component side or the underside of the printed circuit board), by which the signal given off by the analogue magnetic sensors has opposite polarity.

An actuator with the described position detection system can be used as a single actuator in an application. Moreover, more actuators can be used for parallel driving in e.g. an adjustable table or an adjustable bed, as the signals from the position determination of each actuator can be processed in a control, which controls the operation of the individual actuator and ensures that the parallel driving happens synchronously.

A linear actuator according to the invention will be described more fully below with reference to the accompanying drawing, in which.

Figure 1:
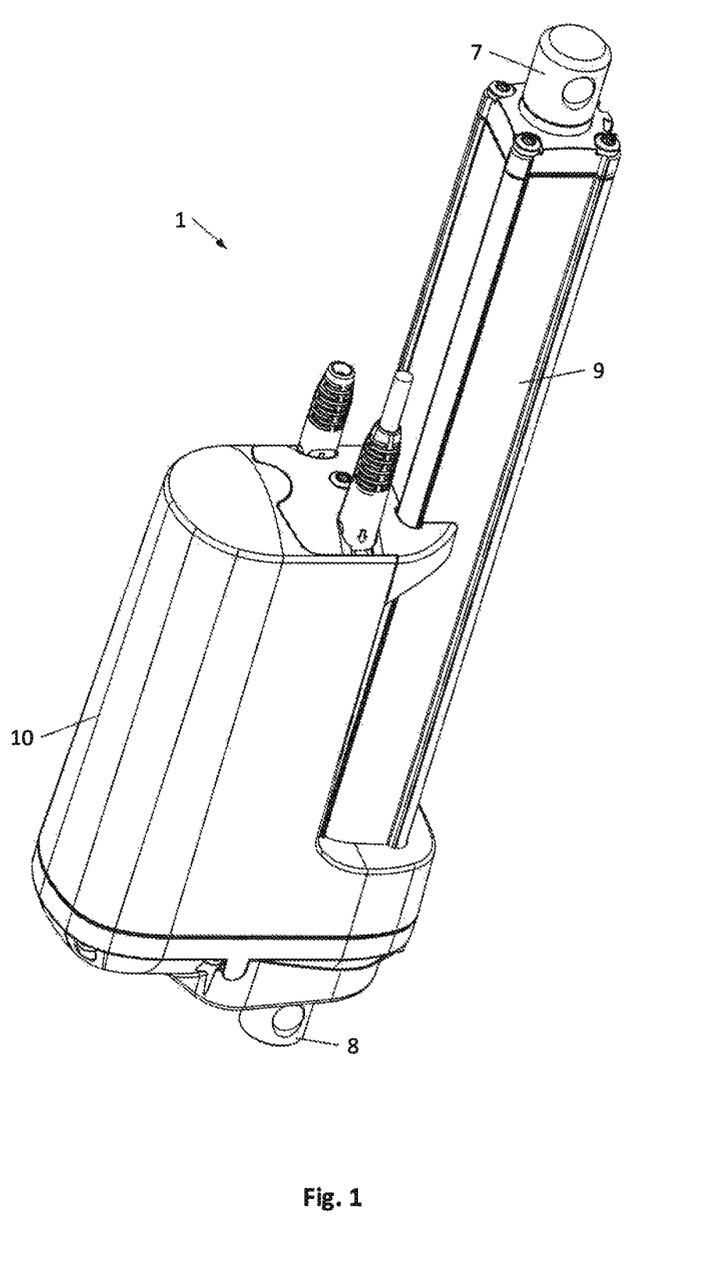
FIG. 1 shows a perspective view of a linear electric actuator.
Figure 2:
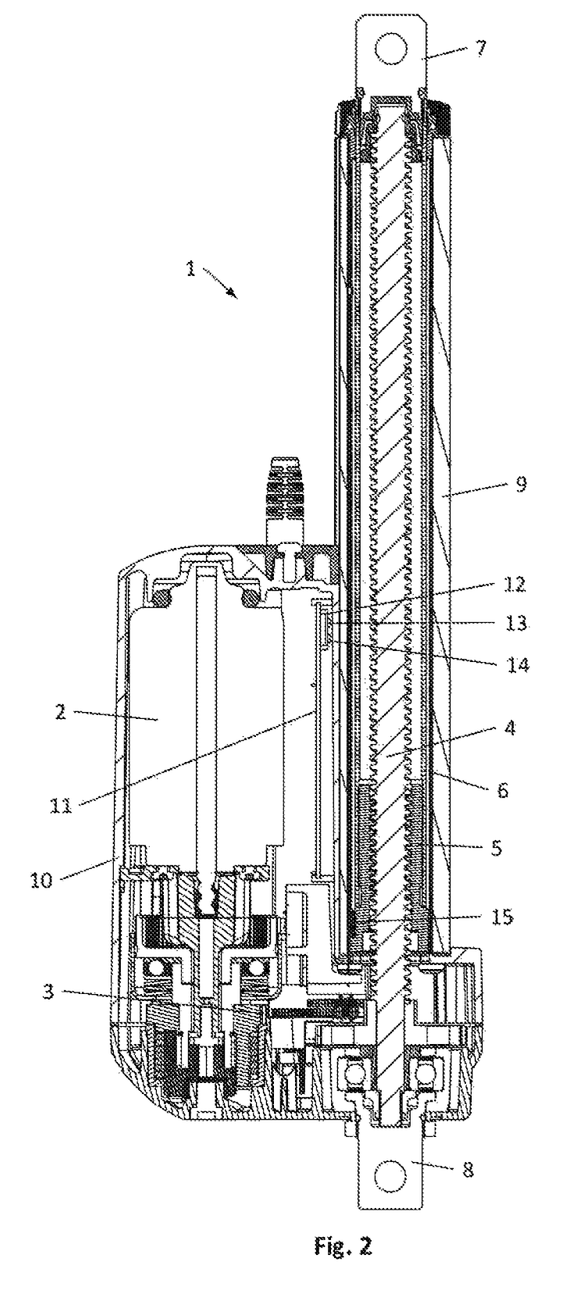
FIG. 2 shows a longitudinal section through a linear electric actuator.

FIGS. 1 and 2 show a schematic example of a linear electric actuator 1 shown in perspective and in a longitudinal section, respectively. The linear electric actuator 1 comprises a reversible electric motor 2, a transmission or a reduction gear 3, typically with multiple steps, a spindle 4, a spindle nut 5 in engagement with the spindle 4, and a tubular activation element 6, also known as inner tube. At its one end the activation element 6 is connected to the spindle nut 5 and at the other end the activation element 6 is equipped with a mounting bracket 7 for mounting the linear electric actuator 1. In addition to the mounting bracket 7, the linear electric actuator 1 also comprises a rear mounting also intended for mounting. When the motor 2 through the transmission 3 rotates the spindle 4, the spindle nut 5 and the activation element 6 will move along the spindle 4. The activation element 6, the spindle nut 5 and the spindle are arranged in an outer tube 9, which functions as a guide for the activation element 6. The spindle nut 5 is in engagement with one or more longitudinal grooves in the outer tube 9 and is thus secured against rotation. The linear electric actuator 1 further comprises a housing 10 in which the reversible electric motor 2, the transmission 2 and a printed circuit board are arranged.

For determination of the position of the activation element 6 a position detection system (not shown) is integrated in the actuator, which counts the rotations of the spindle 4 or a different movable element in the actuator where the movement relates to rotations of the spindle 4. This could be rotations of the electric motor 2 or rotations of a gear wheel in the transmission 3. This is an incremental position detection system for which it applies that a reference is given to a known position of the spindle nut 5 during its travel on the spindle 4. Known positions can be an end position or a reference point located as a random desired location on the extent of the spindle 4. It is thus understood that the position detection system indicates the position by indication of a counter stage on a scale, which describes the dynamics area of the possible displacement movements of the activation element 6 by the linear actuator. When a linear electric actuator is built into an application the structure can limit the dynamics area of the linear electric actuator in such a manner that the spindle nut 5 is never moved all the way to the ends of the spindle 4, where a possible end stop can function as a reference point for calibration of the position detection system. The need for calibration of the position detection system arises when the voltage supply is interrupted by which the position detection system is disabled. It is subsequently not possible to know whether the linear electric actuator has been adjusted mechanically, for which reason a new calibration is necessary. The system can however also during operation lose counter pulses, for which reason an ongoing adjustment of minor deviations is also desired.

A control for the linear electric actuator is realized with electronic components built on a printed circuit board 11 located in the housing 10, separated from the mechanical parts of the actuator by means of a side wall. This has the obvious advantages that the electronics are not exposed to soiling by lubricant, which can damage the electronics.

A reference point is as shown in FIG. 2 realized in that there in the control on the printed circuit board 11 is mounted a module in the form of a printed circuit board 12 equipped with at least one magnetic sensor. The printed circuit board 12 can be left out if the magnetic sensors are arranged directly on the printed circuit board 11 for the control. In the specific embodiment, the printed circuit board 12, however, has the advantage that the sensors 13,14 can be arranged closer to the area in which the spindle nut 5 moves. The printed circuit board 12 further has the advantage that the magnetic sensors can be an option which is not necessarily mounted in all linear electric actuators during production of these but can be mounted as a custom extra function. In the specific drawing is shown a preferred embodiment with two analogue magnetic sensors, a first magnetic sensor 13 and a second magnetic sensor 14. The sensors 13,14 are, as can be seen, arranged after each other with a short distance between them collateral with or parallel to the direction of extent of the spindle. It should especially be noticed that the sensors 13,14 are arranged inside the housing 10 of the linear electric actuator and thus appear as very integrated in the actuator. This is practical as the sensors are mechanically protected and are better shielded from possible external magnetic and electric fields, which can be the cause of error measurements. The magnetic sensors 13, 14 are stroked by a magnet 15 arranged in connection with the spindle nut 5 when the spindle nut 5 moves past the point where the magnetic sensors 13,14 are arranged on travel of the spindle nut 5 on the spindle 4.

Figure 3:
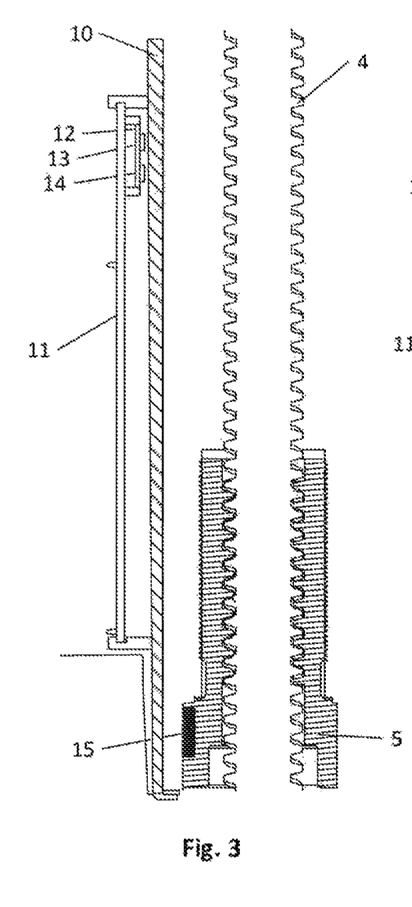
FIG. 3 shows a detailed view of a magnetic sensor system for calibrating a position detection system with the spindle nut shown in one position.
Figure 4:
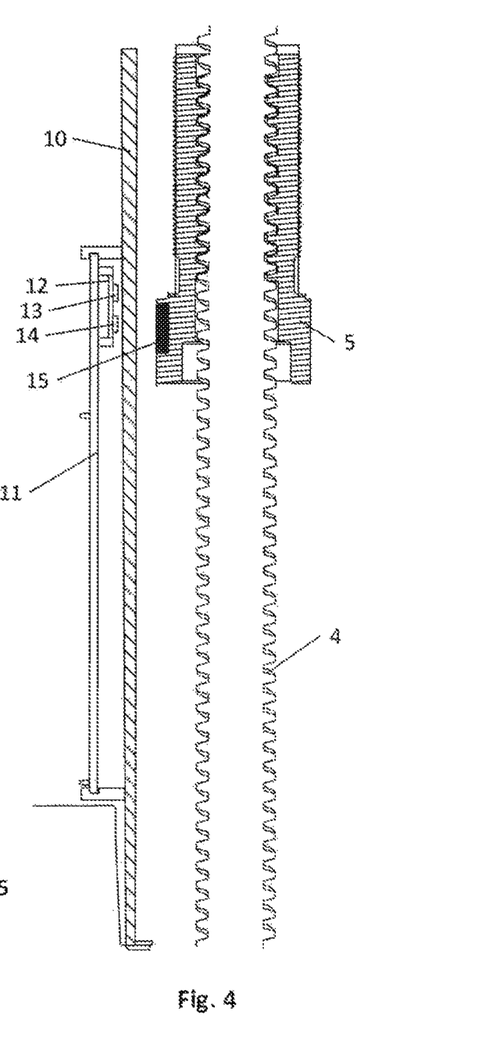
FIG. 4 shows a detailed view of a magnetic sensor system for calibrating a position detection system with the spindle nut shown in another position.
Figure 5:
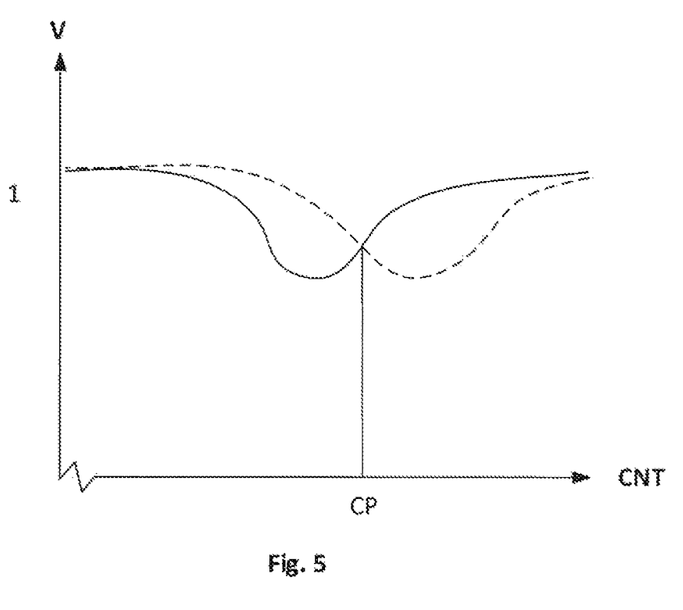
FIG. 5 shows a diagram, which shows a reading of a magnetic sensor system.

Two positions of the spindle nut 5 on its travel on the spindle 4 are shown in FIGS. 3 and 4. As it appears from the snapshot in FIG. 4, the magnet 15 is exactly opposite the second magnetic sensor 14, but is also in a position, where the first magnetic sensor 13 is affected by the magnetic field. If the magnetic sensors 13,14 are of the digital type the signals they give out will be dependent on the measured strength of the magnetic field and the hysteresis, which is built into the sensors 13,14. The position detection system can thus be adapted to measure the changing times and assess whether a calibration of the counter in the position detection system is required and which counter value it should be overwritten with in order to calibrate the counter to the current conditions. In the case of two analogue magnetic sensors 13,14, an absolute reference point can be defined by the position detection system monitoring the signals from the first magnetic sensor 13 and the second magnetic sensor 14 to determine the moment where the amplitude of the two signals is the same. This situation is further shown in FIG. 5, where the dotted curve shows the output signal of an analogue magnetic sensor and the unbroken line shows the output signal of an analogue magnetic sensor 14. As can be seen, the crossing point is marked "CP", a clearly defined point, which is not changed by the strength of the magnet 15. This would only displace the crossing of the curves upwards or downwards, but not change the position of the crossing point in the direction of the x-axis. The direction of the x-axis can be defined analogously with the counter of the position detection system, such that the crossing point CP can be a reference or calibration value indicated in a specific counter stage which exactly corresponds to the position of the spindle nut 5 during its travel on the spindle 4 in this specific position. It is noted that the output voltage from the two magnetic sensors 13,14 is affected negatively by the meeting with the magnet 15. If a positive increasing signal from the magnetic sensors is desired at the meeting with the magnet 15, this can be achieved either by reversing the polarity of the magnet 15 or arranging the magnetic sensors 13,14 such that the magnetic field affects the sensors from the other side. In other words, the sensors should be rotated 180 degrees about their own axis, which can be achieved by mounting them on the other side of the printed circuit board 12. The possibility of arranging two magnets 15 with opposite polarity in connection with the spindle nut 5 or the activation element 6 with a mutual distance between them, makes it possible to establish at least two defined reference or calibration points for adjusting the counter of the position detection system in order to indicate the correct position of the spindle nut 5 during its travel on the spindle 4.

The linear electric actuator comprises a microprocessor in the control, which handles functions in connection with the operation of the electric motor 2, including supervision of the motor speed and the over load circuit breaker. The position detection system can expediently be constructed with overall control from the microprocessor for the control, which is both an economic and practical solution, as the instructions for operation of the position detection system thus can be included in the general software package of the control for download in the control and for operation of the processes thereof.

The term "microprocessor", which is used in the description, covers any unit which can fulfil the requirements for data processing of the described process carried out by the microprocessor mentioned in the description. When software is mentioned, it relates to portions of programme code, which in connection with the operation thereof in the microprocessor manages a monitoring and control function in the control of the actuator.

The invention claimed is:

1. A linear actuator (1) comprising a reversible DC-motor (2), which through a transmission (3) drives a spindle (4) and thus applies a linear movement to a spindle nut (5) retained against rotation, where the spindle nut (5) is connected to an activation element (6), which can be displaced between two end positions on the spindle (4), a power supply for the DC motor (2),
an electric control,
a housing for surrounding mechanical and electric components of the actuator (1),
a position detection system for determining the position of the spindle nut on the spindle, wherein the position detection system is encased in the housing (10) and comprises at least two magnetic sensors (13, 14) arranged in a position on a length parallel to the axial direction of extent of the spindle (4) and further comprises a magnet (15) arranged in connection with the spindle nut (5) or the activation element (6),
wherein the position detection system is configured to:
receive and process a signal from each of the at least two magnetic sensors;
compare the signals from the at least two magnetic sensors; and indicate that a calibration point for the position detection system has been reached when the amplitude of the signals from both sensors falls within a predetermined window.

2. A linear actuator (1) according to claim 1 wherein the position detection system is also configured to calibrate the counter value of the position detection system such that it corresponds to a predetermined counter value of the position of the spindle nut (5) during travel on the spindle (4).

3. A linear actuator (1) according to claim 1 wherein the at least two magnetic sensors (13, 14) are digital magnetic sensors, which in the same manner as a switch is activated when the applied magnetic field exceeds a first threshold value, and is deactivated when the applied magnetic field falls below a second threshold value.

4. A linear actuator (1) according to claim 1 wherein the at least two magnetic sensors (13, 14) are analogue magnetic sensors, which gives a signal, which is proportional to the applied magnetic field.

5. A linear actuator (1) according to claim 4, wherein the position detection system is capable of registering when the magnetic field near one of the two magnetic sensors changes, and recognize a pattern where the strength of the magnetic field increases to a maximum and subsequently falls again.

6. A linear actuator (1) according to claim 5, wherein the position detection system has a sample rate for the reading of the magnetic field near one of the two magnetic sensors, which in a normal state has a first frequency which when the amplitude of the measured signal changes or increases, changes to a different frequency.

7. A linear actuator (1) according to claim 6, wherein the position detection system has means for comparing the change in the magnetic field to the change in counter value and validate that the reading of the change of strength of the magnetic field corresponds to the speed of the linear movement of the spindle nut on the spindle.

8. A linear actuator (1) according to claim 7, wherein the position detection system has means for determining a maximum point of the strength of the magnetic field and read off the counter value of the position detection system and calculate a deviation from the calibration point and change the counter value of the position detection system.

9. A linear actuator (1) according to claim 4 wherein the magnetic sensor (13, 14) are of the analogue type and are positioned with such a distance between them that they both due to the width of the magnet give a signal, when the magnet is led past the sensors where the signal from one sensor is increasing while the signal from the other sensor is decreasing.

10. A linear actuator (1) according to claim 1, wherein one sensor is activated before the other sensor and is deactivated before the other when the spindle nut with magnet moves past.

11. A linear actuator (1) according to claim 1 wherein the magnetic sensors are of the digital type, and are arranged such that their signals overlap when the magnet is lead past the sensors.

12. A linear actuator (1) according to claim 11 wherein the first of the magnetic sensors is activated and deactivated immediately before the other magnetic sensor is activated and deactivated, where the order of whether the first or the second of the sensors is activated first or last depends on the direction of movement.

13. A linear actuator (1) according to claim 1 wherein the position detection system is adapted to indicate the reliability of the current value for the position determination by placing a flag, when the current value for position determination is calibrated with the value of a calibration point, and remove the flag, when the supply voltage for the position determination system is interrupted.

14. A linear actuator (1) according to claim 1 wherein the position detection system is adapted, when a calibration point is reached, to compare a current value for the position determination to the value of the position determination for the calibration point and respond by performing one of the following actions:
 1) overwrite the current value for position determination with the value of the position determination for the calibration point,
 2) Change the current value for the position determination by a number, which causes the current value to come closer to the value of the position determination for the calibration point,
 3) Check the status of the flags for reliability and, if the status of flags indicates that the position detection system is not calibrated, overwrite the current value for position determination with the value of the position determination for the calibration point,
 4) Determine the difference between the current value for position determination and the calibration value and, in case of a difference in counter value which is larger than a predetermined value, keep the current value and wait until the next meeting with a calibration point before the current value for position determination is overwritten with the value of position determination for the calibration point,
 5) Determine the direction of the movement of the activation element by assessing whether the current value of the position detection system changes positively or negatively, and depending on the direction overwrite the current value of the position detection system with the value of the position determination for the calibration system adjusted by a value in the form of a number, which can vary depending on the direction of the movement of the activation element.

15. A linear actuator (1) according to claim 1 wherein the at least two magnetic sensors (13, 14) are arranged on or in connection with a printed circuit board (11, 12) for the electric control, where the electric control and the at least two magnetic sensors (13, 14) are arranged separately from the spindle (4) and spindle nut (5) with a non-magnetic shielding wall.

16. A linear actuator (1) according to claim 15 wherein the printed circuit board of the electric control is arranged in the housing, such that this runs parallel to the spindle, and where the at least two magnetic sensors are arranged in such a manner that they are situated in the direction of extend of the spindle and are separated by a wall in the housing.

17. A linear actuator (1) according to claim 1 wherein the housing is made from a magnetic non-permeable material, where the housing is equipped with a window in the form of an opening opposite the position where a calibration point between the magnet arranged in connection with the spindle nut and the at least two magnetic sensors is arranged in the electric control.

18. A linear actuator (1) according to claim 17, wherein the opening is equipped with a cover, which is made from, or which includes, a magnetic permeable material.

19. A linear actuator (1) according to claim 1 wherein the position detection system comprises a plurality of magnets which are arranged in various positions in connection with the spindle nut or the activation element.

20. A linear actuator (1) according to claim 19 wherein the plurality of magnets have different strengths from each other and thus individually can be unambiguously indicated by measuring with the at least two magnetic sensors.

21. A linear actuator (1) according to claim 19 wherein the plurality of magnets are arranged differently from each other with regard to their field direction.

22. A linear actuator (1) according to claim 1 wherein the at least two magnetic sensors are arranged rotated about their axis 180 degrees from each other.

* * * * *